United States Patent [19]

Becelaere

[11] 4,366,830

[45] Jan. 4, 1983

[54] DAMPER ASSEMBLY

[75] Inventor: Robert V. Becelaere, Grandview, Mo.

[73] Assignee: Ruskin Manufacturing Company, Grandview, Mo.

[21] Appl. No.: 218,459

[22] Filed: Dec. 19, 1980

[51] Int. Cl.³ .............................................. F16K 17/38
[52] U.S. Cl. ........................................ 137/75; 137/80; 137/512.15; 137/512.4; 137/512.5; 160/1; 49/1
[58] Field of Search .............. 137/75, 80, 512.4, 512.5, 137/527, 601, 512.15; 160/1, 9, 84, 181, 207; 49/1, 386

[56] References Cited

U.S. PATENT DOCUMENTS

| 3,009,473 | 11/1961 | Heunen | 137/601 X |
| 3,720,153 | 3/1973 | Jardinier | 137/75 |
| 3,831,628 | 8/1974 | Kintner | 137/527 |
| 4,263,930 | 4/1981 | McCabe | 137/601 X |
| 4,295,486 | 10/1981 | McCabe | 137/601 X |

FOREIGN PATENT DOCUMENTS

| 2307228 | 10/1976 | France | 137/75 |
| 2316513 | 4/1977 | France | 137/75 |

Primary Examiner—Harold W. Weakley
Attorney, Agent, or Firm—Litman, Day and McMahon

[57] ABSTRACT

A damper assembly is provided which comprises a duct having an opening and a blade movable between a closed position in covering relation to a portion of the opening and an open position. A fusible retainer holds the blade in its open position and releases the blade when the retainer is sufficiently heated. When released, the blade is urged to its closed position by a hinge member which connects the blade to the duct. The blade in its closed position cooperates with the hinge member to substantially prevent flow of fluid through the opening.

18 Claims, 18 Drawing Figures

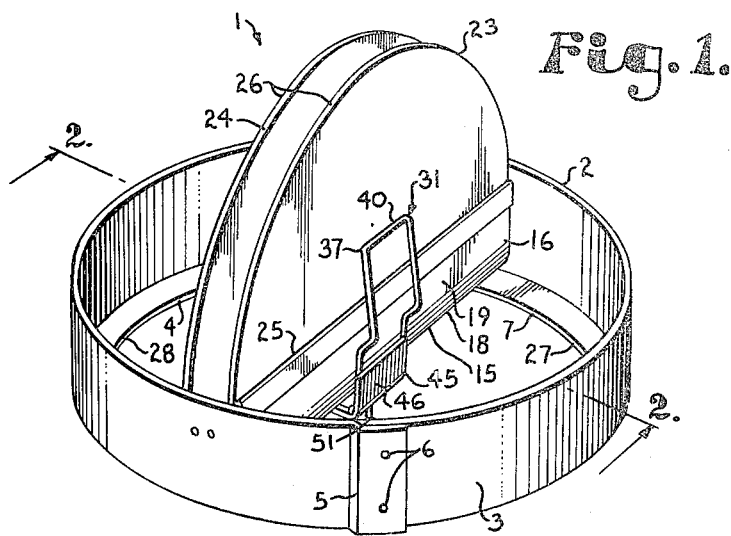
Fig. 1.
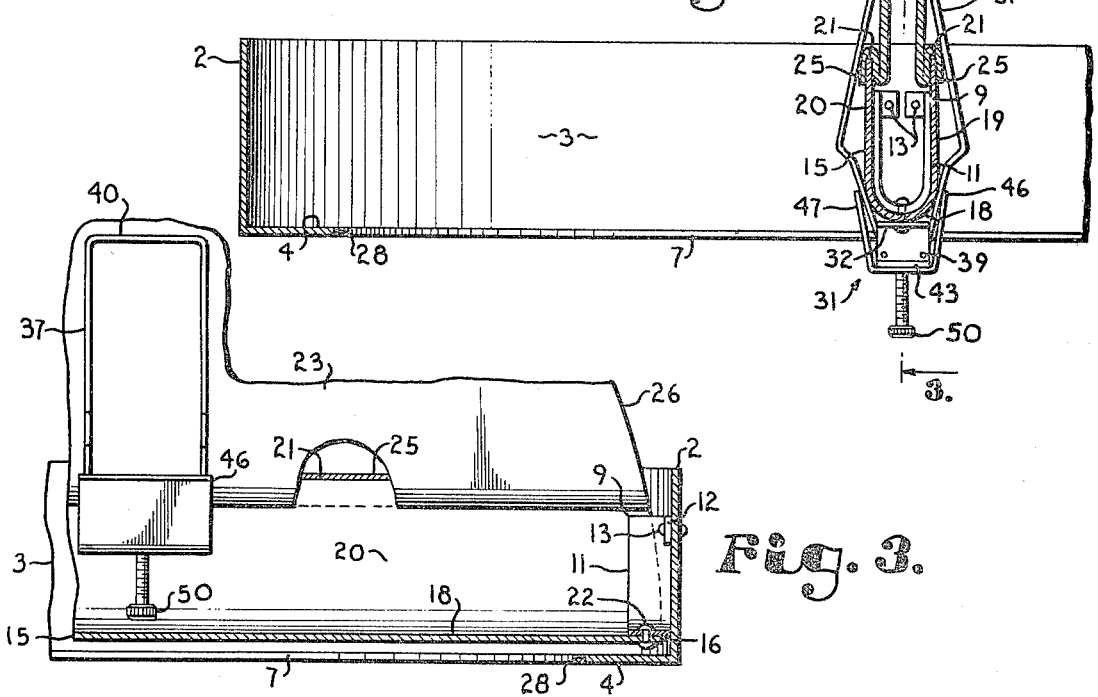
Fig. 2.
Fig. 3.
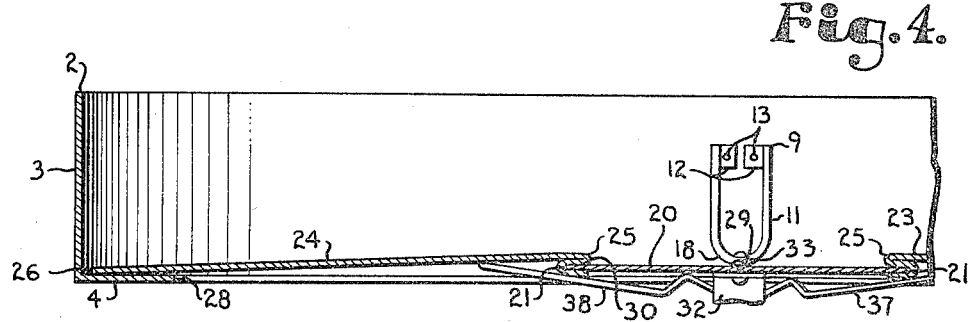
Fig. 4.

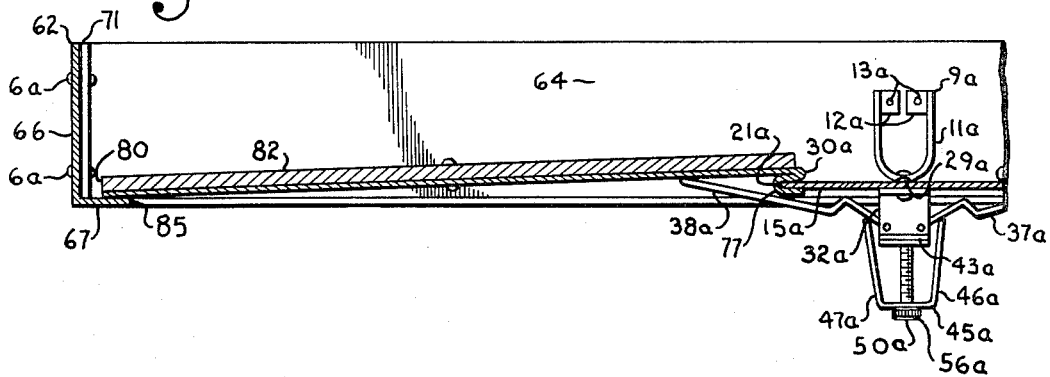
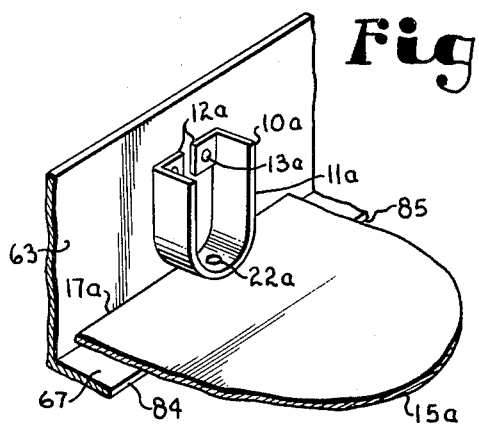
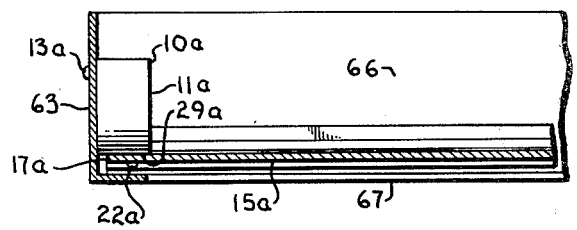
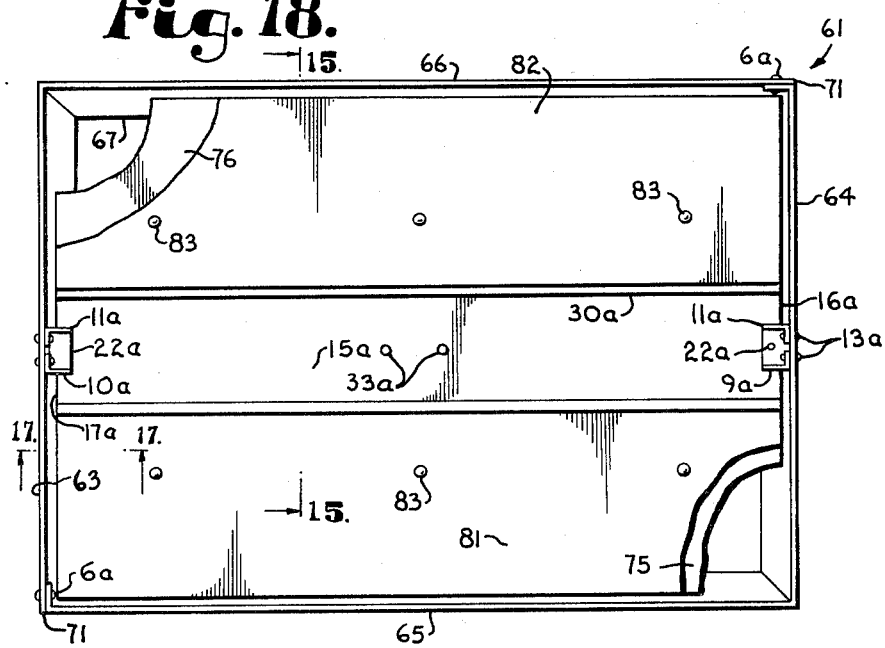

DAMPER ASSEMBLY

BACKGROUND OF THE INVENTION

This invention relates to valve assemblies, and in particular, to a fire damper assembly.

Building and fire codes require that fire dampers be placed in specified heating, ventilation and air conditioning (HVAC) ducts. Such dampers are normally open to allow air flow therethrough and closed in the event of a fire to prevent smoke, toxic gases, heat and the fire itself from being transmitted through the duct. Also, fire dampers help smother a fire by sealing off the area of a blaze and preventing fresh air from circulating through a structure's duct work to the flames.

Blades in such fire damper assemblies may be held in an open position by heat responsive linkage means such as the bimetallic link shown in the McCabe U.S. Pat. No. 4,146,048 which shows a pair of hinged blades in a butterfly damper restrained in an open position until a predetermined air temperature is reached.

Other prior art fire dampers include those shown in the Gerlitz U.S. Pat. No. 2,825,275 and the Coe U.S. Pat. No. 2,912,920 which, unlike the present invention, are normally closed and spring open in the event of a fire to dissipate heat and smoke. The devices shown therein both utilize fusible links which melt at predetermined temperatures and release the damper blades to spring open.

However, prior art fire damper assemblies normally have spring means for urging the blades to a closed position and hinging means separate from the spring means. This additional complexity tends to reduce the reliability of such devices because dirt and grease can accumulate thereon over long periods of time with the damper assembly in its normal position. Another deficiency of the hinge mechanisms of certain prior art dampers, such as that shown in the Richterkessing et al U.S. Pat. No. 3,009,475, is that they do not provide a positive and sealable connection between the two blades and are therefore susceptible to leakage. Further, many prior art fire dampers have only 2 positions, wide open or fully closed, and do not allow for varying the air flow therethrough.

SUMMARY OF THE INVENTION

The damper assembly of the present invention includes a duct with an opening and a blade movable between a closed position covering a portion of the opening and an open position. A fusible retainer, when sufficiently heated, releases the blade from its normal open position. A hinge member connects the blade to the duct and urges the blade to its closed position, thus eliminating the need for separate hinging and spring mechanisms. Such an arrangement considerably simplifies construction and reduces the cost of such a damper assembly as compared to prior art devices.

Accordingly, the principle objects of the present invention are: to provide a damper assembly which closes in the event of a fire; to provide such a damper assembly which is relatively unaffected in operation by the accumulation of dirt and grease thereon; to provide such a damper assembly which utilizes a blade movable between a closed position and an open position; to provide such a damper assembly which substantially prevents the flow of air therethrough when the blade is in its closed position; to provide such a damper assembly which includes a hinge member which urges the blade to its closed position; to provide such a damper assembly wherein the hinge member provides a positive and sealable connection between a pair of blades to prevent the flow of air therebetween; to provide such a damper assembly wherein the blades are held open by a fusible retainer; to provide such a damper assembly which releases the blades when the fusible retainer is sufficiently heated; to provide such a damper assembly with a fusible retainer which does not significantly impede air flow therein; to provide such a damper assembly which includes brackets having a corresponding configuration to the hinge member for attaching same to a duct; and to provide such a damper which is economical to manufacture, efficient in use, capable of a long operating life and particularly well adapted for the proposed usage thereof.

Other objects and advantages of this invention will become apparent from the following description taken in conjunction with the accompanying drawings wherein are set forth by way of illustration and example certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a damper assembly embodying the present invention, shown with a pair of blades in an open position.

FIG. 2 is an enlarged, fragmentary, vertical cross-sectional view of the damper assembly taken along line 2—2 of FIG. 1.

FIG. 3 is an enlarged, fragmentary, vertical cross-sectional view of the damper assembly taken along line 3—3 of FIG. 2.

FIG. 4 is an enlarged, fragmentary vertical cross-sectional view of the damper assembly, taken along line 4—4 of FIG. 7 and showing the blades in a closed position thereof.

FIG. 15 is an enlarged, fragmentary, vertical cross-sectional view of the modified damper assembly taken along line 15—15 of FIG. 18 and showing a blade in a closed position.

FIG. 16 is an enlarged, fragmentary, perspective view of the modified damper assembly particularly showing the attachment of the hinge member to a bracket.

FIG. 17 is an enlarged, fragmentary, vertical cross-sectional view of the modified damper assembly taken along line 17—17 of FIG. 18.

FIG. 18 is a top plan view of the modified damper assembly with the blades in their closed positions and with portions broken away to reveal the construction thereof.

DESCRIPTION OF THE PREFERRED EMBODIMENTS

Figure 5:
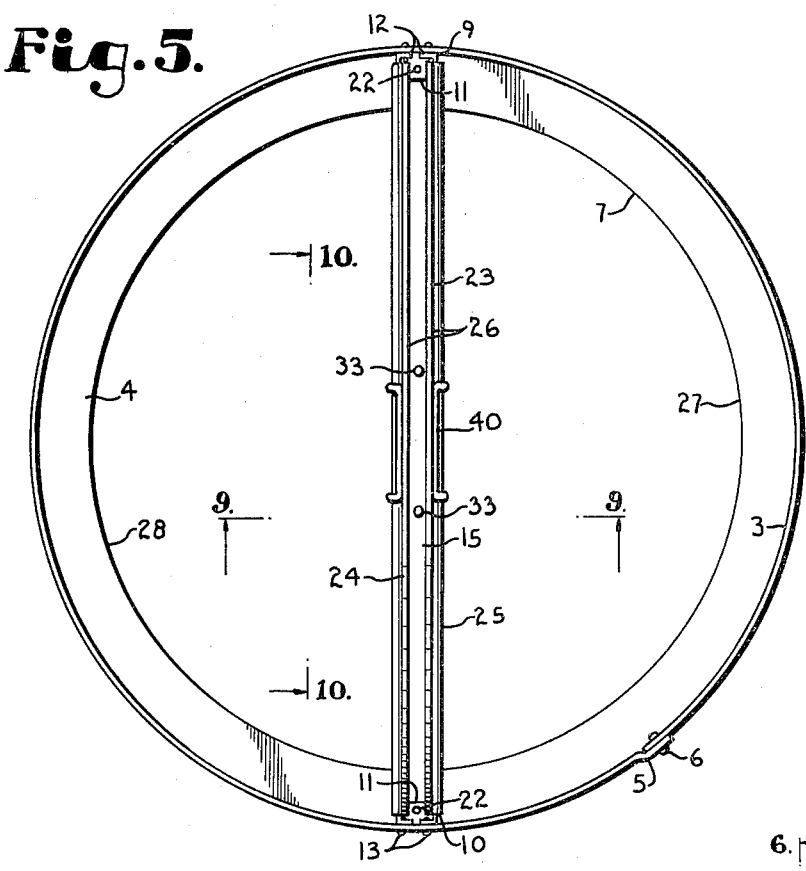
FIG. 5 is a top planned view the damper assembly, showing the blades in the open position thereof.
Figure 6:
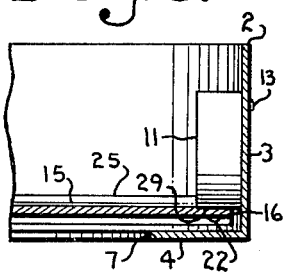
FIG. 6 is an enlarged, fragmentary, vertical cross-sectional view of the damper assembly, particularly showing the attachment of a hinge member to a bracket and taken along line 6—6 of FIG. 7.

As required detailed embodiments of the present invention are disclosed herein, however, it is to be understood that the disclosed embodiments are merely exemplary of the invention which may embodied in various forms. Therefore specific structural and functional details disclosed herein are not to be interpreted as limiting, but merely as a basis for the claims and as a representative basis for teaching one skilled in the art to variously employ the present invention in virtually any appropriately detailed structure. For purposes of description herein the terms "upper", "lower", "right", "left", "rear", "front", "vertical", "horizontal" and derivatives thereof shall relate to the invention as oriented in FIG. 2 for the first embodiment, as seen in FIGS. 1 through 11, and as orietated in FIG. 14 for the modified embodiment, as seen in FIGS. 12 through 18. However, it is to be understood that the invention may assume various alternative orientations except where expressly specified to the contrary.

With reference to the embodiment shown in FIGS. 1 through 11, the reference numeral 1 generally designates a damper assembly with a frame 2 having a side wall 3 and flange 4 extending radially inwardly therefrom. The ends of the side wall 3 are suitably secured together as by lap seam 5, with rivets 6 into a circular configuration. A circular opening 7 is defined by the flange 4 to allow fluid flow through the frame 2. First and second brackets 9 and 10 respectively each comprise a U-shaped member 11 with ears 12 extending therefrom and adapted to receive rivets 13 for securing the brackets 9 and 10 to the side wall 3 in diametrically opposed relationship.

Figure 9:
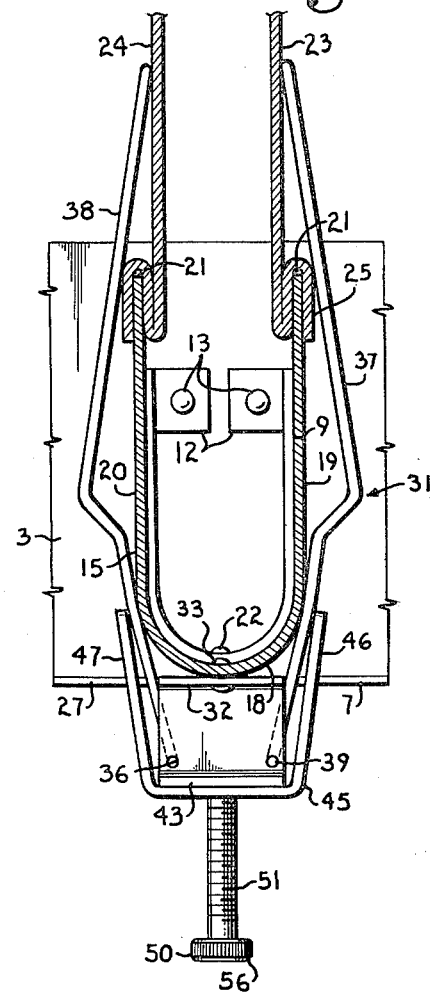
FIG. 9 is an enlarged, fragmentary, vertical cross-sectional view of the damper assembly taken along line 9—9 of FIG. 5 and particularly showing the fusible retainer holding the blades in the open position thereof.
Figure 10:
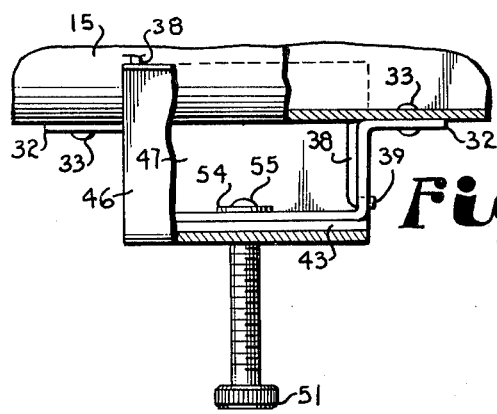
FIG. 10 is an enlarged, fragmentary, vertical cross-sectional view of the damper assembly taken along line 10—10 of FIG. 5 and particularly showing the fusible retainer with portions broken away.

A hinge member 15 having opposed first and second end portions 16 and 17 respectively, extends across the frame 2. The hinge member 15 preferably is comprised of a flat elongated piece of spring steel or the like which may be bent about its longitudinal axis, as seen in FIGS. 2 and 9, whereby a curved portion 18 is defined with right and left side walls 19 and 20 respectively extending upwardly therefrom. Each upwardly extending side wall 19 and 20 terminates in an upper edge 21. The hinge member first and second end portions 16 and 17 are respectively connected to first and second brackets 9 and 10 by fastener means such as the rivets 22 shown.

End portions 16 and 17 wrap around the U-shaped members 11 of brackets 9 and 10 respectively to define a corresponding U-shaped cross-sectional configuration for hinge member curved portion 18. When hinge member 15 is in a flat, extended position (FIGS. 4 and 6) a line contact 29 is defined between each U-shaped bracket member 11 and a respective hinge member end portion 16 and 17.

Right and left blades 23 and 24 respectively each extend from a respective hinge member side wall 19 and 20. Each blade 23 and 24 has a respective proximate edge 25 folded over the edge 21 of said respective hinge member side wall 19 and 20 whereby a lap seam connection is defined therebetween FIG. 2. Each blade 23 and 24 also has a distal edge 26 with an arcuate configuration whereby the blades 23 and 24 in closed positions thereof in combination with the hinge member 15 define a disk having a circular outer edge concentric with and positioned within the frame 2 (FIG. 7), such that the opening 7 of the frame 2 is effectively blocked by the blades 23 and 24 in the closed positions thereof. In particular, the right and left blades 23 and 24 in their closed positions cover right and left portions 27 and 28 respectively of opening 7 through frame 2. A gap 30 between the blade proximate edges 25 is covered by hinge member 15 whereby the entire duct opening 7 is thus effectively sealed when the blades 23 and 24 are in their closed positions.

The blades 23 and 24 are normally held in their open positions by a fusible retainer 31 (FIG. 8), which includes a mounting bracket 32 secured to the bottom of hinge member 15 by rivets 33 positioned within rivet apertures 34. The mounting bracket 32 is also provided with a center aperture 35 and two pair of opposed apertures 36, each pair being positioned on a respective side of bracket 32. Right and left arms 37 and 38 respectively are comprised of spring steel wire and each have feet 39 extending outwardly therefrom and a distal end 40. Each arm 37 and 38 is pivotally connected to the mounting bracket 32 by positioning its feet 39 within a respective pair of aligned apertures 36 situated on the same side of the bracket 32 as the respective arms 37 and 38. A plate 43 with a boss 49 and a threaded aperture 44 therethrough is soldered to a channel 45, the melting temperature of the solder determining the temperature at which the fire damper assembly 1 will close. Threaded aperture 44 aligns with a corresponding aperture 48 in channel 45 and aperture 35 in the bracket 32. Channel 45 has upwardly extending right and left side walls 46 and 47 respectively.

Figure 11:
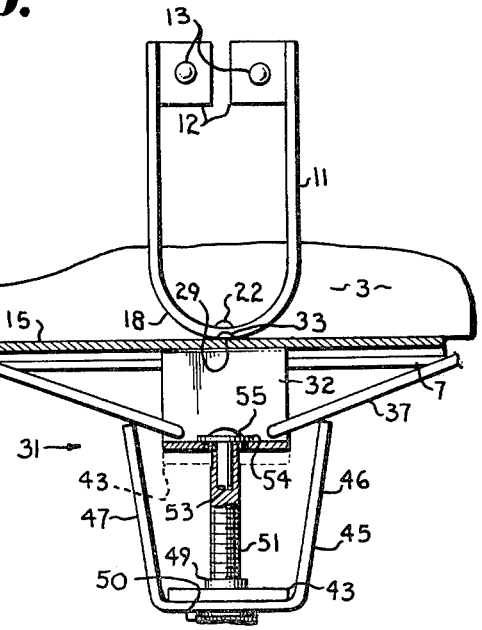
FIG. 11 is an enlarged, fragmentary, vertical cross-sectional view of the damper assembly taken along line 11—11 of FIG. 7 and showing the fusible retainer released and a blade in the open position thereof.

The fusible retainer 31 is secured together by a screw 50 having a threaded portion 51 and an unthreaded end portion 52 with a bore 53 extending therethrough. A screw head 56 is provided opposite the unthreaded end portion 53 and receives a screwdriver or wrench whereby the screw 50 may be rotated. The threaded portion 51 is loosely positioned within channel aperture 48 which has a slightly larger diameter so that the threaded portion 51 is freely rotatable therein and engagement of aperture 48 by threaded portion 51 is avoided. Thus, with the plate 43 and channel 45 disconnected, as after a fire has melted the solder connection therebetween, channel aperture 48 is allowed to slip along the threaded portion 51. Threaded portion 51 is screwed into plate threaded aperture 44 whereby relative rotation between screw 50 and plate 43 causes axial movement of screw 50 with respect to plate 43. The screw 50 is also loosely and freely rotatably received within mounting bracket aperture 35 which has substantially the same diameter as channel aperture 48. The screw 50 is retained within mounting bracket aperture 35 by washer 54 positioned over unthreaded end portion 52 and retained by rivet 55 extending into bore 53 (FIG. 11). Thus, screw 50 extends through mounting bracket aperture 36, plate threaded aperture 44 and channel aperture 48, but the threaded portion 51 thereof engages only the threaded aperture 44 of plate 43 for reasons which will be more fully set out hereinafter.

Figure 8:
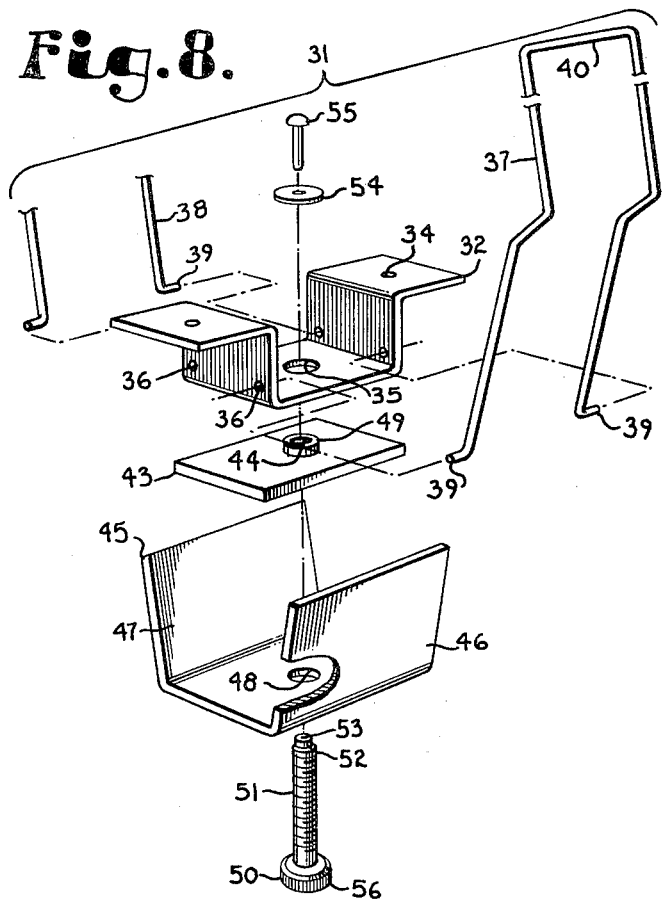
FIG. 8 is an exploded, enlarged perspective view of a fusible retainer.

To assemble the fusible retainer 31, plate 43 is first soldered to channel 45 with threaded aperture 44 aligned with channel aperture 48. Screw 50 is then inserted through channel aperture 48, screwed through threaded aperture 44 and inserted into mounting bracket center aperture 35 with its unthreaded end portion 52 extending therefrom. Washer 54 is then placed over the unthreaded end portion 52 and fastened thereto by rivet 55 (FIGS. 8 and 11). In the next stage of assembly, screw 50 is preferably screwed almost entirely through threaded aperture 44 so that screw head 56 is adjacent plate 43, as shown in FIG. 11. With the mounting bracket 32 riveted to the hinge member 15 and the right and left arms 37 and 38 respectively connected to the mounting bracket 32, the damper assembly 1 is, at this assembly stage, in the closed position thereof (FIG. 11) and ready for adjustment to a desired open position, such as that shown in FIG. 2. Screw 50 is then rotated counterclockwise to move the plate 43 and channel 45, which are soldered together, upwardly relative to the bracket 32 as a single unit.

The right and left channel side walls 46 and 47 respectively engage right and left arms 37 and 38 and squeeze them together in a pincher-type manner. The arm distal ends 40 engage right and left blades 23 and 24 respectively and thereby move them upwardly to their open positions. When drawn upwardly by screw 50 into a first position channel 30, thus, partially surrounds the hinge member curved portion 18 to retain the blades 23 and 24 as shown in FIG. 9. The screw member 50 allows for adjustment of the angle of pitch of the right and left blades 23 and 24 by lowering or raising the channel member 45 and threaded plate 43 with respect to the mounting bracket 32. Thus the damper assembly 1 can be adjusted for different amounts of air flow therethrough.

Figure 7:
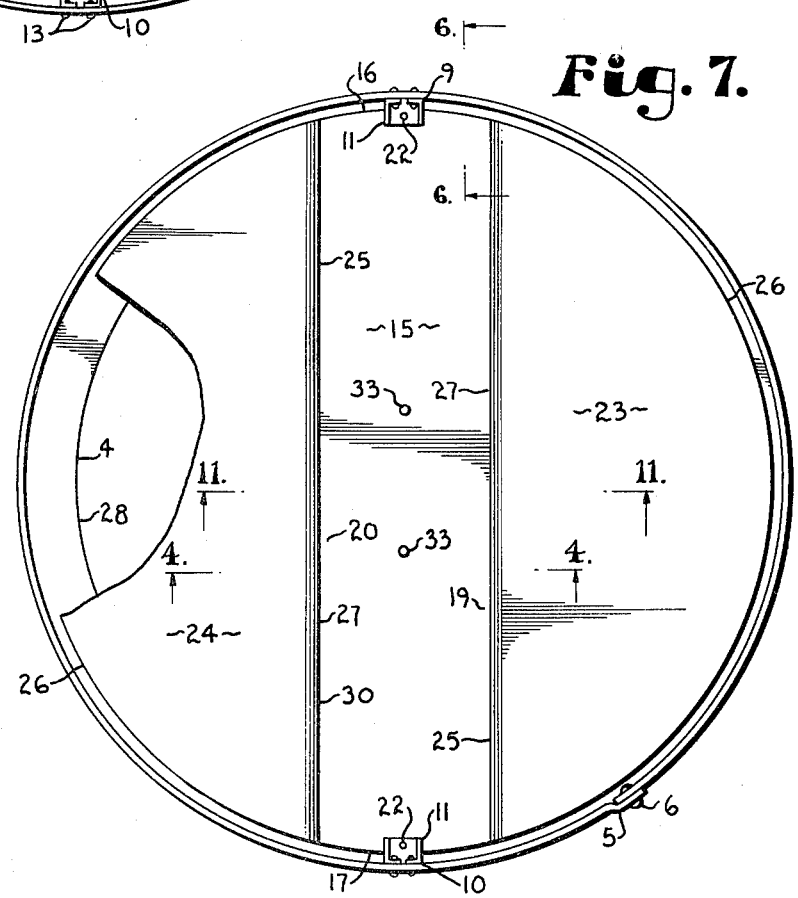
FIG. 7 is a top plan view of the damper assembly showing the blades in the closed position thereof, with a portion of a blade broken away.

The damper assembly 1 is shown in FIG. 9 with the blades 23 and 24 in their open positions to allow flow of fluid through the opening 7. In the event of a fire, the solder securing or attaching threaded plate 43 to channel 45 melts upon reaching a predetermined temperature and releases channel 45, to a second position thereof, wherein hinge member 15 and blades 23 and 24 spring to their flat closed positions as seen in FIGS. 7 and 11 and arms 37 and 38 rotate outwardly and downwardly at the distal ends thereof. The diameter of aperture 48 through the channel member 45 being larger than the diameter of the threaded portion 51 of screw 50, the channel member 45 will thus be biased by the spring action of hinge member 15 downwardly away from plate 43 along screw 50 to its second position below the level of hinge member 15. If screw head 56 has a greater diameter than channel aperture 48, channel 45 will be caught thereby and thus be positioned, with plate 43 remaining adjacent mounting bracket 47, as shown in phantom in FIG. 11. Alternatively, if screw head 56 has a smaller diameter than channel aperture 48, channel 45, when released, will be flung away from the damper assembly 1.

With the blades 23 and 24 in their closed positions, their respective distal edges 26 engage flange 4. The blades 23 and 24 with the flattened hinge member 15 thereby form a substantially co-planar disk which, in conjunction with the flange 4, prevents the flow of fluid through the duct 2. By utilizing the hinge member 15 as a spring for urging the blades 23 and 24 open, simplicity in manufacture is achieved and a positive bridge is provided for covering the gap 30 between the blade proximate edges 25. Also, the simplicity of the damper assembly 1 and its relatively small number of moving parts will tend to increase the reliability thereof. This feature is particularly important in typical fire damper applications where the damper assemblies remain unattended in their open positions for years and are subject to the accumulation of dirt, grease and other foreign matter carried with the moving air through the duct passages. With the blades in their open positions, the fusible retainer 31 is substantially the same width as the hinge member 15 and the blades 23 and 24 and therefore has no appreciable effect on the passage of fluid through the duct 2.

With the blades 23 and 24 in their closed positions, the damper assembly 1 thereby substantially closes duct 2, and, in the event of a fire, serves to block the transmission of smoke, toxic gasses, heat and flames therethrough. A fire will thereby tend to be confined to the side of the fire damper assembly 1 on which it started and will be deprived of additional air which might otherwise reach it if the duct 2 were open.

Figure 12:
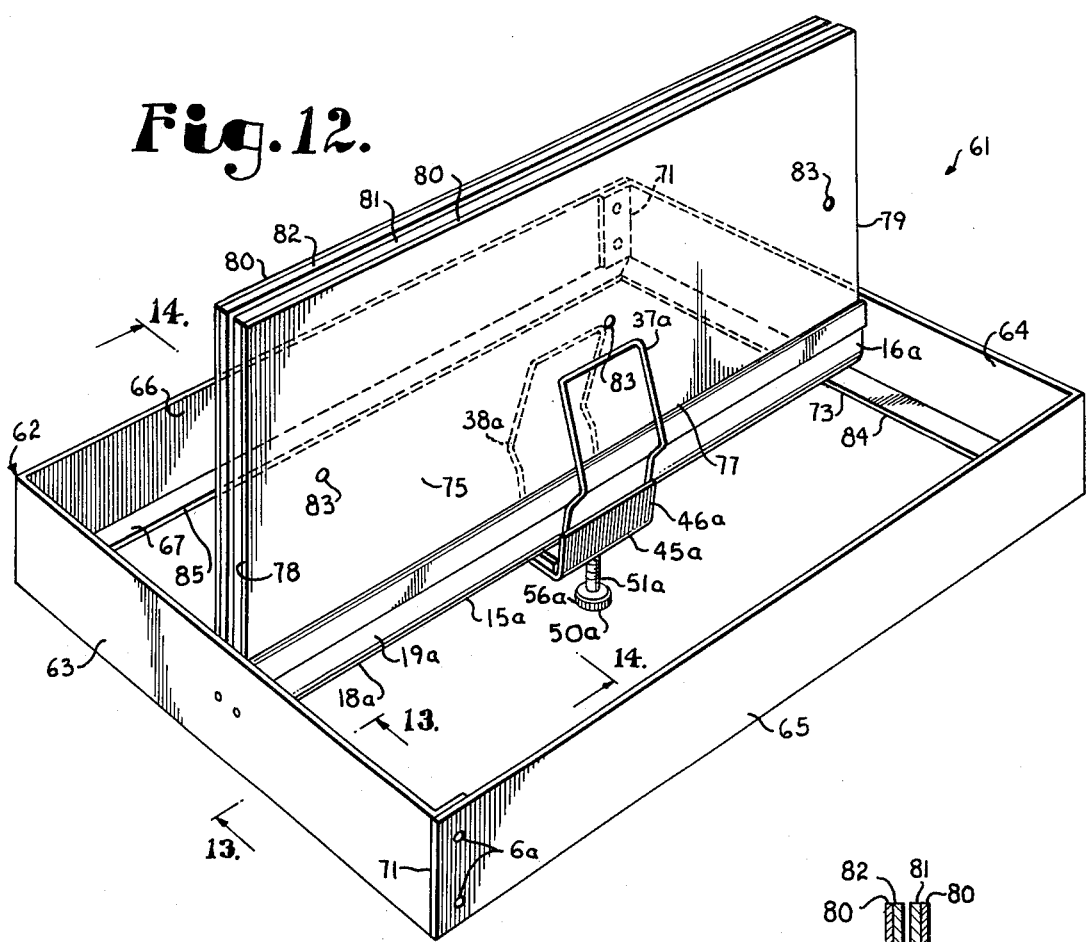
FIG. 12 is a perspective view of a modified damper assembly embodying the present invention, shown with a pair of blades in an open position.
Figure 13:
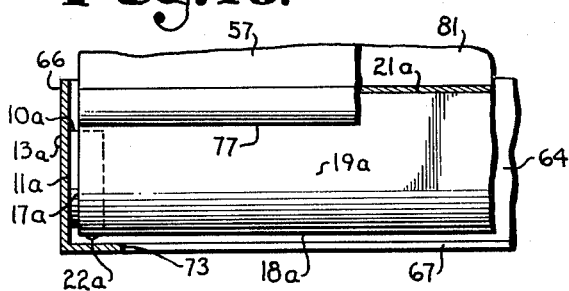
FIG. 13 is an enlarged, fragmentary, vertical cross-sectional view of the modified damper assembly, with a portion broken away to reveal the attachment of a blade to a hinge member taken along line 13—13 of FIG. 12.
Figure 14:
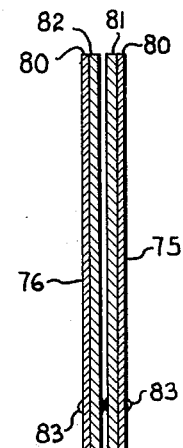
FIG. 14 is an enlarged fragmentary vertical cross-sectional view of the modified damper assembly taken along line 14—14 of FIG. 12 and showing the blades in the open positions thereof.
Figure 14:
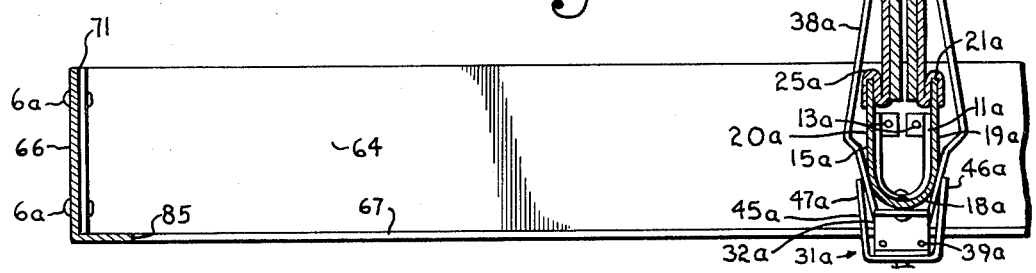

The reference numeral 61 (FIGS. 12–18) generally represents a modified embodiment of the invention for use in a ventilation duct 62 having a rectangular cross-section. Since the damper assembly 61 is otherwise substantially the same as the previously described damper assembly 1, similar parts appearing in FIGS. 1–11 and FIGS. 12–18 respectively are represented by the same corresponding reference numeral except for the addition of suffix "a" to the numerals of the modified device. The rectangular duct or frame 62 comprises opposed front and rear side walls 63 and 64 respectively and opposed right and left side walls 65 and 66 respectively. As shown in FIG. 12, the front and left side walls 63 and 66 respectively and the back and right side walls 64 and 65 respectively are formed as separate sections which are connected by lap seams 71 with rivets 6a at opposite corners of the frame 62. Flanges 67 project inwardly from each side wall 63, 64, 65 and 66 respectively and thereby define a rectangular opening 73 for allowing fluid to flow through the damper assembly 61.

First and second brackets 9a and 10a are respectively riveted to front side wall 63 and back side wall 64 and comprise U-shaped members 11a and ears 12a projecting therefrom for receiving rivets 13a. A hinge member 15a has opposed first and second end portions 16a and 17a respectively each attached to a respective bracket 9a and 10a by rivets 22a. The hinge member 15a when folded with the damper assembly 61 open, as in FIG. 14, exhibits a curved portion 18a and right and left side walls 19a and 20a respectively, each terminating in an edge 21a. Line contacts 29a are defined between each U-shaped member 11a and respective hinge end portions 16a and 17a when the damper assembly 61 is closed and the hinge member 15a is in a substantially flat configuration (FIGS. 15 and 17).

Right and left blades 75 and 76 respectively each exhibit a proximate edge 77, opposed front and back edges 78 and 79 respectively and a distal edge 80. A gap 30a between distal edges 80 is bridged by hinge member 15a when blades 75 and 76 are in their closed positions (FIG. 18). Right and left panels 81 and 82 respectively of insulating material, for example plaster wall board with the trade name Sheetrock, are shown attached to right and left blades 75 and 76 respectively by rivets 83. The insulation panels 81 and 82 tend to reduce the transmission of heat across the respective blades 75 and 76 when in the closed positions thereof, over right and left portions 84 and 85 respectively of opening 73, that is, as shown in FIGS. 15 and 18.

A fusible retainer 31a includes a mounting bracket 32a with right and left arms 37a and 38a respectively pivotally attached thereto. Each arm 37a and 38a has a pair of feet 39a for pivotal connection to mounting bracket 32a and a distal end 40a for engaging a respective blade 75 and 76. A plate 43a is soldered to a channel 45a having right and left side walls 46a and 47a respectively. A screw 50a is threaded through plate 43a and has a head 56a, a threaded portion 51a and an unthreaded end portion (not shown) with a washer (not shown) attached thereto by a rivet (not shown) for rotation with respect to mounting bracket 32a. As with the damper assembly 1, the screw 50a allows for adjustably positioning the blades 75 and 76.

The fire damper assembly 61 operates in substantially the same manner as the circular fire damper assembly 1. Upon reaching a predetermined temperature, the solder between plate 43a and channel 45a melts, releasing the arms 37a and 38a and thereby allows the right and left blades 75 and 76 respectively to be sprung open by hinge member 15a. The blade edges 78, 79 and 80 respectively engage side wall flanges 67 of the duct frame 62. The right and left blades 75 and 76 respectively cover right and left portions 84 and 85 of the opening 73 and the hinge member 15a bridges the gap 30a between the blade proximate edges 77. The duct frame 62 is thus substantially closed to the passage of fluid therethrough.

It is to be understood that while certain forms of the present invention have been illustrated and described herein, it is not to be limited to these specific forms or arrangement of parts herein described and shown.

What is claimed and desired to secure by Letters Patent is:

1. A damper assembly comprising:
   (a) a duct having an opening for the passage of fluid therethrough;
   (b) a pair of rigid blades each movable between a closed position in covering relation to a respective portion of said opening and an open position; each of said blades having:
      (1) a proximate edge, the respective proximate edges of said blades being in spaced relationship and defining a gap therebetween when said blades are in said open position;
      (2) a distal edge positioned adjacent said duct whereby the flow of fluid between said distal edge and said duct is substantially prevented when said blades are in said closed position; and
   (c) a hinge member attached to said duct and extending unsupported across said opening, said hinge member:
      (1) terminating at opposite longitudinal edges, rigidly attached to said proximate edges of said blades whereby said blades cantilever from said hinge member;
      (2) urging said blades to said closed position;
      (3) substantially preventing the flow of fluid through said gap between said proximate edges of said blades; and
      (4) said hinge member comprising a flexible spring having a substantially flat configuration when said blades are in their closed position.

2. A damper assembly as set forth in claim 1 which includes:
   (a) a heat-responsive retainer means for holding said blades in said open position and for releasing said blades when said retainer means in sufficiently heated.

3. A damper assembly as set forth in claim 1 which includes:
   (a) said hinge member having opposed end portions;
   (b) said hinge member having an arcuate cross-sectional configuration when said blades are in said open position; and
   (c) a pair of brackets each having an arcuate cross-sectional configuration corresponding to said cross-sectional configuration of said hinge with said blades in their closed position, each bracket connecting a respective said hinge member end portion to said duct and terminating at an inner margin; said bracket inner margins being in spaced relation across said duct opening.

4. A damper assembly as set forth in claim 3 which includes:
   (a) each said bracket defining a line contact with said respective hinge member end portion when said blades are in said closed position.

5. A damper assembly as set forth in claim 3 wherein:
   (a) when said blades are in said open position, said hinge member comprises:
      (1) a longitudinal curved portion having an arcuate cross-sectional configuration; and
      (2) a pair of opposed longitudinal side walls each extending from said longitudinal curved portion in a direction substantially parallel to the direction of fluid flow through said duct terminating at a respective hinge member longitudinal edge.

6. In a fire damper assembly comprising a duct having an opening, a blade connected to said duct and movable between a closed position in covering relation to a portion of said opening and an open position, the improvement of heat-responsive and retainer means comprising:
   (a) a channel member associated with said blade and having a first position relative to said blade wherein said blade is urged into said open position and a second position relative to said blade wherein said blade is free to move to said closed position;
   (b) said channel member having a side wall;
   (c) a hinge member connecting said blade to said duct and urging said blade to said closed position;
   (d) mounting means fusibly interconnecting said channel member and said hinge member in said first position; said channel member being released to said second position when said mounting means is sufficiently heated;
   (e) an arm connected to said mounting means in spaced relation to said channel member side wall when said channel member is in the first position thereof such that said arm engages said side wall and is urged to support said blade in the open position thereof when said channel member is in said first position; said arm being free to swing with respect to said mounting means when said channel is in said second position whereby said arm allows said blade to be urged by said hinge means to said closed position thereof.

7. A fire damper assembly as set forth in claim 6 which includes:
(a) a plate with a threaded aperture therethrough and fusibly connected to said channel member; and
(b) a screw positioned in said threaded aperture and connected to said mounting means.

8. A fire damper assembly as set forth in claim 7 which includes:
(a) rotating said screw member a first direction moves said blade to said open position;
(b) rotating said screw member a second direction moves said blade to said closed position; and
(c) said screw member being adapted for adjustably positioning said blade between said open and closed positions.

9. A fire damper assembly as set forth in claim 8 which includes:
(a) a solder connection between said channel member and said plate; and
(b) said solder being fusible at a predetermined temperature.

10. A fire damper assembly as set forth in claim 6 which includes:
(a) said arm being pivotally connected to said mounting means.

11. A damper assembly comprising:
(a) a duct having an opening for the passage of fluid therethrough;
(b) a pair of blades each movable between a closed position in covering relation to a respective portion of said opening and an open position; each of said blades having;
  (1) a proximate edge, the respective proximate edges of said blades being in spaced relationship and defining a gap therebetween when said blades are in said open position;
  (2) a distal edge positioned adjacent said duct when said blades are in said closed position whereby the flow of fluid between said distal edge and said duct is substantially prevented; and
(c) a hinge member attached to said duct and extending across said opening, said hinge member;
  (1) being attached to the proximate edges of said blades;
  (2) urging said blades to said closed position; and
  (3) substantially preventing the flow of fluid through said gap between said proximate edges of said blades;
(d) a mounting bracket attached to said hinge member;
(e) a pair of arms pivotally connected to said mounting bracket;
(f) a plate with a threaded aperture therethrough;
(g) a screw positioned in said threaded aperture and pivotally connected to said mounting bracket;
(h) a channel member having a pair of side walls, said channel member having a first position wherein said side walls each engage a respective said arm and said arms each support a respective said blade in the open position thereof against said biased means and a second position wherein each said arm is connected to said mounting bracket in spaced relation to a respective said side wall whereby each said arm is free to rotate with respect to said mounting bracket to allow said respective blade to be urged by said biasing means to said closed position thereof; and
(i) a soldered connection between said channel member and said plate, said soldered connection being fusible at a predetermined temperature, said channel member being released from said plate to said second position when said soldered connection is heated to said predetermined temperature.

12. A fire damper assembly as set forth in claim 11 which includes:
(a) rotating said screw member a first direction moves said blades to said open position;
(b) rotating said screw member a second direction moves said blades to said closed position; and
(c) said screw member being adapted for adjustably positioning said blade between said open and closed positions.

13. A damper assembly comprising:
(a) a duct having an opening for the passage of fluid therethrough;
(b) a pair of rigid blades each movable between a closed position in covering relation to a respective portion of said opening and an open position; each of said blades having:
  (1) a proximate edge, the respective proximate edges of said blades being in spaced relationship and defining a gap therebetween when said blades are in their open position;
  (2) a distal edge positioned adjacent said duct when said blades are in their closed position whereby the flow of fluid between said distal edge and said duct is substantially prevented;
(c) a hinge member attached to said duct and extending unsupported across said opening, said hinge member:
  (1) having opposite end portions each connected to said duct;
  (2) terminating at opposite longitudinal edges each rigidly attached to a respective blade proximate edge whereby said blades cantilever from said hinge member;
  (3) comprising a flexible spring having a substantially flat configuration with said blades in their closed position and an arcuate configuration with said blades in their open position; and
  (4) substantially preventing the flow of fluid through said gap between said plate proximate edges; and
(d) heat-responsive retainer means for holding said blade in said open position and for releasing said blades when said retainer means is sufficiently heated.

14. The damper assembly according to claim 13 which includes:
(a) a pair of brackets each terminating in a respective inner edge and attached to said duct in opposite, spaced relation across said opening, each said bracket having an arcuate cross-sectional configuration corresponding to said cross-sectional configuration of said hinge with said blades in their closed position;
(b) a respective hinge member end portion being attached to each said bracket.

15. The damper assembly according to claim 14 which includes:

(a) said duct having a flange extending inwardly and substantially surrounding said opening;
(b) said blades engaging said flange in their closed position; and
(c) each said hinge member end portion being positioned between a respective bracket and said flange in close-spaced relationship to said flange.

16. The damper assembly according to claim 15 which includes:
(a) each said bracket having a U-shaped cross-sectional configuration with a convex outer surface;
(b) each said hinge member end portion being attached to a respective bracket at its convex outer surface; and
(c) each said hinge member longitudinal edge and blade proximate edge terminating in opposite ends positioned adjacent a respective bracket with said blades in their open position.

17. The damper assembly according to claim 14 which includes:
(a) an insulating material mounted on each said blade, said insulating material being positioned between said blades in their open position;
(b) said arcuate configuration of each said bracket being adapted to position said hinge member longitudinal edges in spaced relation whereby said blades are positioned in correspondingly spaced relation in their open position with said insulating material therebetween.

18. A damper assembly comprising:
(a) a duct having an opening for the passage of fluid therethrough and an inwardly extending flange substantially surrounding said opening;
(b) a pair of rigid blades each movable between a closed position engaging said flange in covering relation to a respective portion of said opening and an open position substantially parallel to a path of fluid flow through said opening; each of said blades having:
(1) a proximate edge, the respective proximate edges of said blades being in spaced relationship and defining a gap therebetween when said blades are in their open position;
(2) a distal edge engaging said flange when said blades are in their closed position whereby the flow of fluid between said distal edge and said duct is substantially prevented;
(c) a pair of brackets each terminating in a respective inner edge and attached to said duct in opposite, spaced relation across said opening, each said duct having a U-shaped cross-sectional configuration with a convex surface;
(d) a hinge member attached to said duct and extending unsupported across said opening, said hinge member:
(1) having opposite end portions each attached to a respective bracket convex surface in close spaced relation to said flange;
(2) terminating at opposite longitudinal edges each rigidly interconnected with the respective blade proximate edge whereby said blades cantilever outwardly from said hinge member;
(3) comprising a flexible spring having a substantially flat configuration with said blades in their closed position and an arcuate cross-sectional configuration corresponding to said cross-sectional configuration of said brackets with said blades in their open position; and
(4) substantially preventing the flow of fluid through said gap between said blade proximate edges; and
(e) heat responsive retainer means for holding said blades in their open position and for releasing said blades when said retainer means is sufficiently heated whereby said hinge means moves said blades to their closed position.

* * * * *